(12) United States Patent
Kwak

(10) Patent No.: US 12,510,175 B2
(45) Date of Patent: Dec. 30, 2025

(54) CHECK VALVE AND BRAKE SYSTEM INCLUDING THE SAME

(71) Applicant: HL MANDO CORPORATION, Gyeonggi-do (KR)

(72) Inventor: Sungho Kwak, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 32 days.

(21) Appl. No.: 18/433,418

(22) Filed: Feb. 6, 2024

(65) Prior Publication Data

US 2024/0288083 A1 Aug. 29, 2024

(30) Foreign Application Priority Data

Feb. 28, 2023 (KR) .................. 10-2023-0027032

(51) Int. Cl.
*F16K 15/06* (2006.01)
*B60T 13/68* (2006.01)

(52) U.S. Cl.
CPC .......... *F16K 15/063* (2013.01); *B60T 13/686* (2013.01)

(58) Field of Classification Search
CPC .......................... F16K 15/063; B60T 13/686
See application file for complete search history.

(56) References Cited

U.S. PATENT DOCUMENTS 5,172,720 A * 12/1992 Richards ............. F16K 27/0209
137/454.5
2023/0303046 A1 * 9/2023 Kim ....................... B60T 13/14

* cited by examiner

*Primary Examiner* — P. Macade Nichols
(74) *Attorney, Agent, or Firm* — WOMBLE BOND DICKINSON (US) LLP

(57) ABSTRACT

An example embodiment of the present disclosure relates to a check valve and a brake system including the same. A check valve which selectively transfers oil stored in a reservoir to a hydraulic pressure supply device includes a valve body with a hollow formed inside, a seat disposed in the hollow, a valve element which is disposed by being at least partially inserted into the seat, moves along a longitudinal direction of the valve body, and is capable of supplying the oil, and a spring disposed inside the seat to provide elastic force to the valve element.

19 Claims, 4 Drawing Sheets

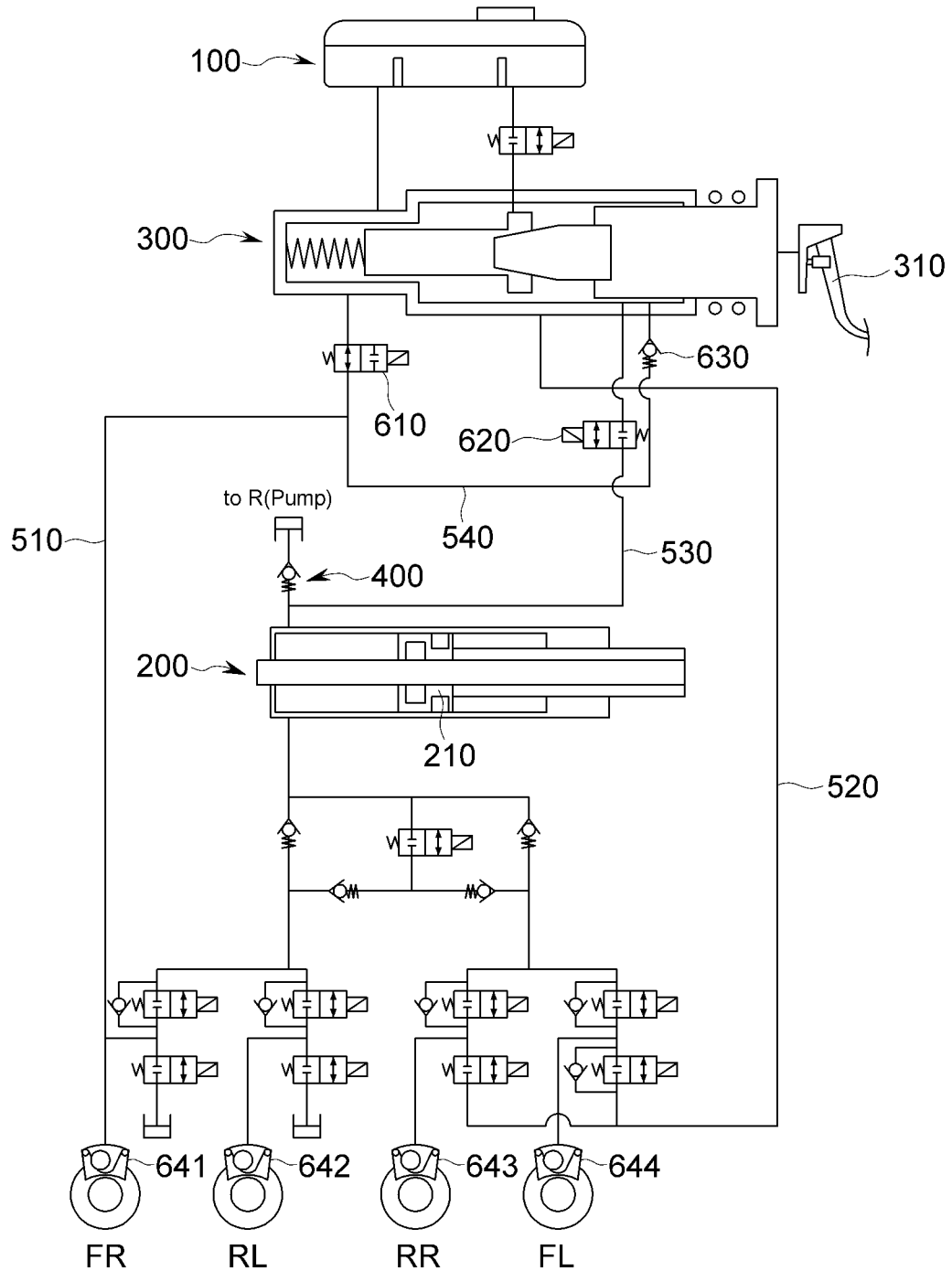
[Fig.1.]

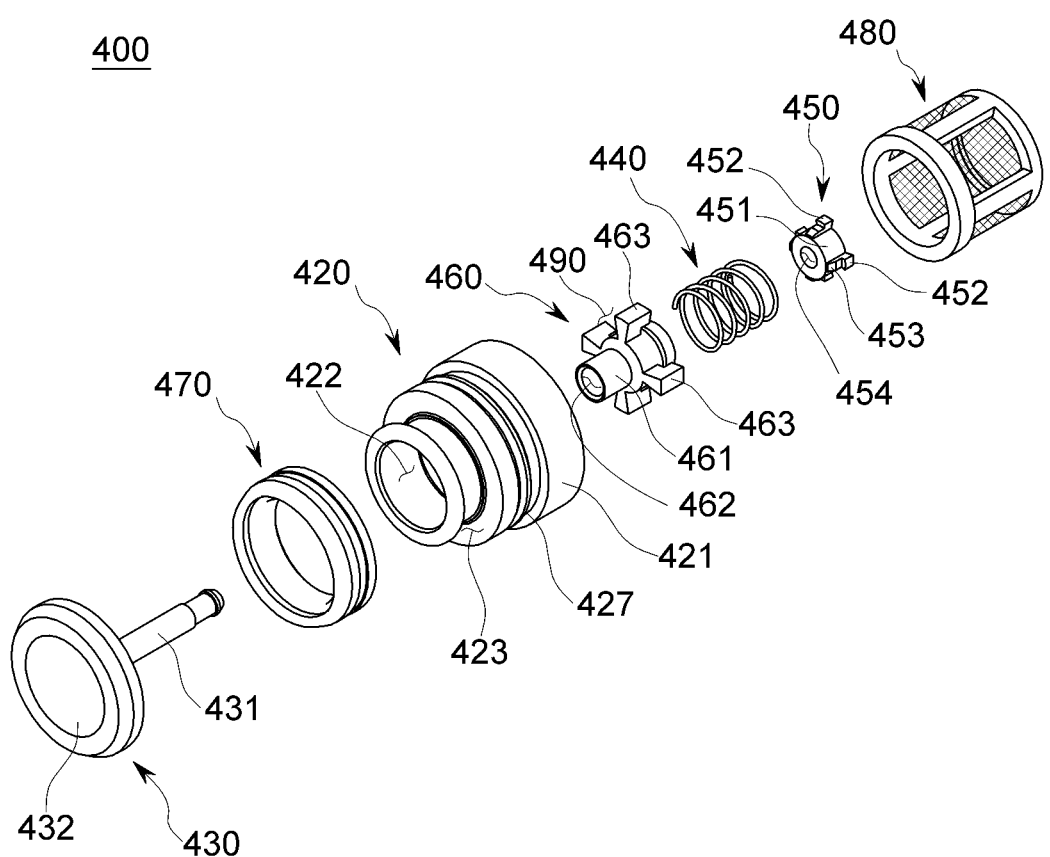
[Fig.2]

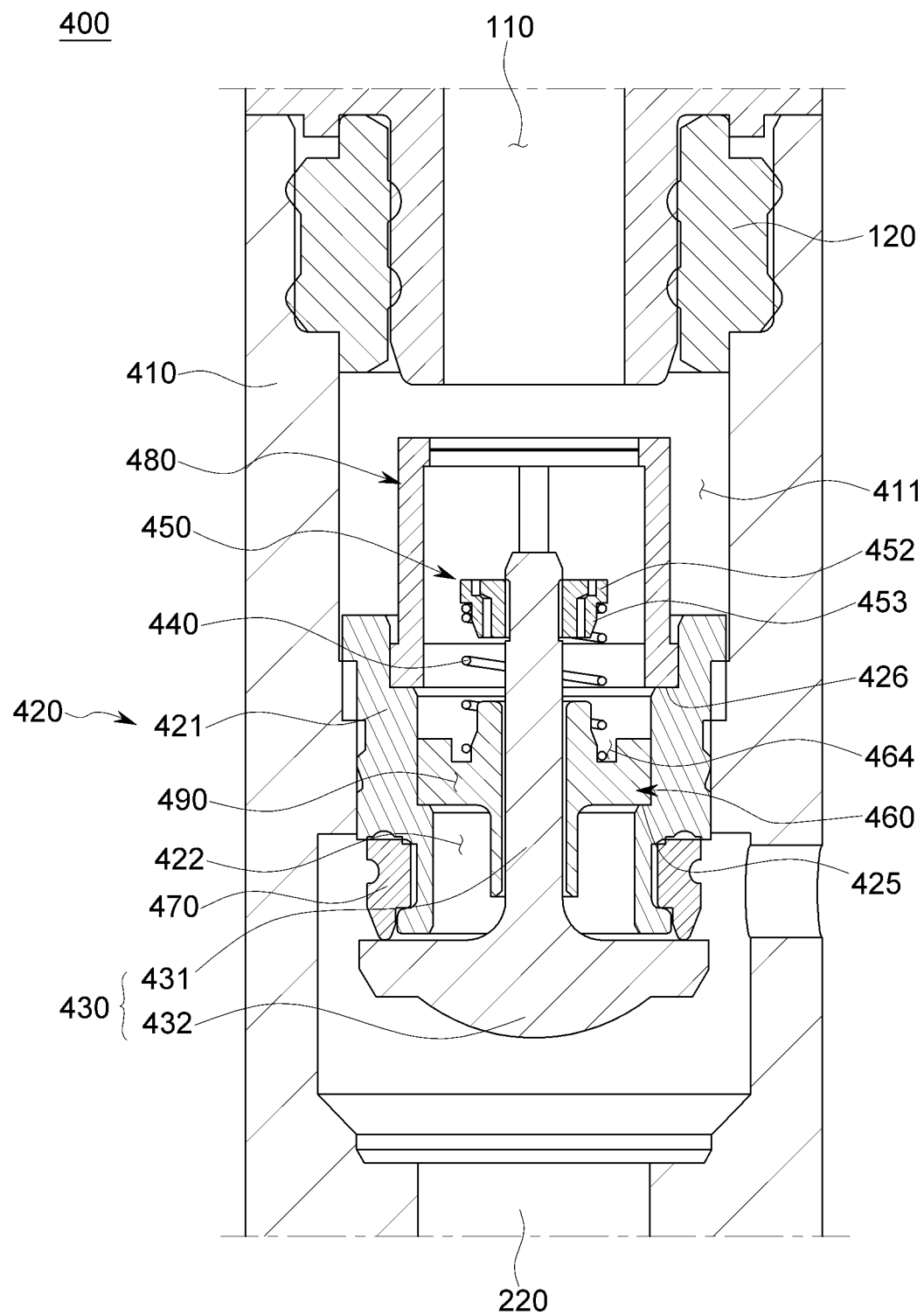
[Fig.3]

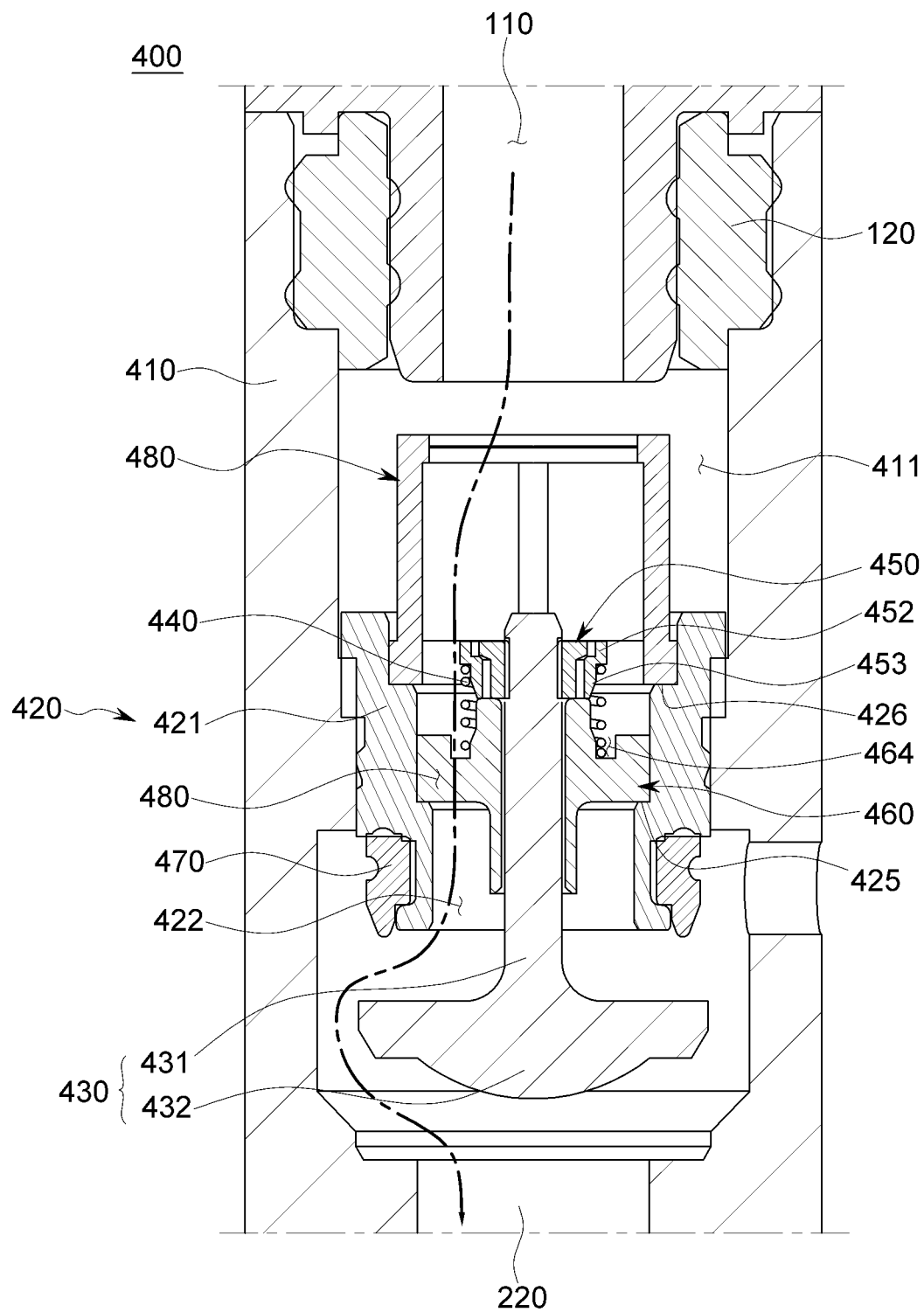
[Fig.4.]

CHECK VALVE AND BRAKE SYSTEM INCLUDING THE SAME

CROSS-REFERENCE TO RELATED APPLICATION

This application claims the benefit of Korean Patent Application No. 10-2023-0027032 filed on Feb. 28 2023, in the Korean Intellectual Property Office, the entire disclosure of which is incorporated herein by reference for all purposes.

BACKGROUND

1. Field of the Invention

Example embodiments of the present disclosure relate to a check valve and a brake system including the same, and more particularly, to a check valve capable of increasing a flow path area in the check valve and minimizing delay of a hydraulic pressure supply device, and to a brake system including the same.

2. Description of the Related Art

In general, a brake system provides a braking force to a wheel according to a pressing pressure provided by a driver or information on a brake pedal. The brake system provides a hydraulic or electrical signal so that the vehicle may brake by receiving information about pressing pressure or brake pedal.

A hydraulic pressure supply device should be supplied with oil when an internal piston moves backward to generate hydraulic pressure when it moves forward.

Specifically, when a cylinder of the hydraulic pressure supply device is formed in a double-acting type, pressure is generated both when the piston of the hydraulic pressure supply device moves forward or backward. However, such a double-acting type cylinder has a problem in that a lot of cost is required.

At this time, when the cylinder of the hydraulic pressure supply device is formed as a single-acting type, since pressure is formed only when the piston of the hydraulic pressure supply device moves forward, oil should be sucked when the piston moves backward for repressurizing after moving forward.

In addition, when delay occurs in the speed for oil intake, a problem may occur in the braking force provided by the hydraulic pressure supply device.

Therefore, there is a need for a check valve capable of minimizing delay for oil intake of a hydraulic pressure supply device and a brake system including the same.

SUMMARY

Example embodiments of the present disclosure provide a check valve capable of quickly supplying oil from a reservoir and a brake system including the same.

According to an example embodiment of the present disclosure, a check valve which selectively transfers oil stored in a reservoir to a hydraulic pressure supply device includes a valve body with a hollow formed inside, a seat disposed in the hollow, a valve element which is disposed by being at least partially inserted into the seat, moves along a longitudinal direction of the valve body, and is capable of supplying the oil, and a spring disposed inside the seat to provide elastic force to the valve element.

In addition, the check valve may further include a stopper coupled to the valve element to prevent the spring from leaving from one side of the valve element.

In addition, the check valve may further include a guide disposed inside the seat to be spaced apart from the stopper around the spring and configured to support movement of the valve element.

In addition, the guide may include a guide body with a guide hole formed inside to support a part of the valve element, a plurality of guide support parts formed to protrude from an outer circumferential surface of the guide body and disposed spaced apart from each other radially, and a spring support groove formed concavely in the guide support part and capable of supporting the spring.

In addition, the check valve may further include a seal disposed between one outer circumferential area of the seat and the hollow.

In addition, the seat may include a seat body with a hollow seat hole formed inside, a seat support protrusion in which a part of an inner side of the seat body protrudes to support the guide support part, and a seal groove in which one outer circumferential area of the seat body is concavely formed, a part of the seal being supported by being inserted into the seal groove.

In addition, the check valve may further include a flow path formed between the plurality of guide support parts and the seat hole, through which the oil moves.

In addition, one side of the seal may be disposed to be in contact with the valve element disposed outside the seat.

In addition, the valve element may include a valve rod part disposed inside the seat, and a head part which is disposed outside the seat and capable of blocking movement of the oil.

In addition, the check valve may further include a filter disposed in the hollow and capable of filtering foreign substances remaining in the oil to be moved to the hydraulic pressure supply device.

In addition, the seat may be press-fitted inside the hollow so that at least a part of an outer circumference of the seat is closely fixed.

In addition, a brake system according to an example embodiment of the present disclosure includes a reservoir in which oil is stored, a master cylinder connected to a brake pedal, a hydraulic pressure supply device configured to generate hydraulic pressure by an electrical signal output in response to a displacement of the brake pedal, and a check valve configured to selectively supply the oil stored in the reservoir to the hydraulic pressure supply device.

In addition, the hydraulic pressure supply device includes a piston, and the check valve may be configured to, when the piston moves in one direction, block the movement of oil between the reservoir and the hydraulic pressure supply device, and when the piston moves in the other direction, allow the oil of the reservoir to move to the hydraulic pressure supply device.

In addition, the check valve may include a valve body with a hollow formed inside, a seat in which one outer area is fixed to an inner surface of the hollow by press-fit, and a valve element which is disposed by being at least partially inserted into the seat, moves along a longitudinal direction of the valve body, and is capable of supplying the oil.

In addition, the seat may include a seat body with a hollow seat hole formed inside.

In addition, the brake system may further include a guide disposed inside the seat hole and configured to support a part of the valve element so as to be movable.

In addition, the guide may include a guide body with a guide hole formed inside to support the part of the valve element, and a plurality of guide support parts formed to protrude from an outer circumferential surface of the guide body and spaced apart from each other radially to be supported in the seat hole.

In addition, the brake system may further include a flow path formed between the plurality of guide support parts and the seat hole, through which the oil moves.

In addition, the brake system may further include a spring configured to provide elastic force to the valve element, and a stopper disposed spaced apart from the guide in a longitudinal direction of the valve element to prevent the spring from leaving.

In addition, the check valve may be configured to, when the piston moves in the other direction, guide the hydraulic pressure supply device to suck the oil of the reservoir.

According to an example embodiment of the present disclosure, a check valve and a brake system including the same may effectively secure the area of a flow path through which oil passes inside the check valve, and may effectively supply oil from a reservoir when a hydraulic pressure supply device sucks oil.

In addition, since the brake system includes the check valve, it is possible to effectively reduce time delay for supplying oil from the reservoir to the hydraulic pressure supply device.

BRIEF DESCRIPTION OF THE DRAWINGS

FIG. 1 illustrates a brake system according to an example embodiment of the present disclosure.

FIG. 2 illustrates an assembly diagram of a check valve according to an example embodiment of the present disclosure.

FIG. 3 illustrates a cross-sectional view of a check valve in a closed state.

FIG. 4 illustrates a cross-sectional view of a check valve in an open state.

DETAILED DESCRIPTION

Hereinafter, example embodiments of the present disclosure will be described in detail with reference to the accompanying drawings so that those skilled in the art can easily carry out the present disclosure. The present disclosure may be implemented in various different forms and is not limited to the example embodiments described herein.

It should be noted that the drawings are schematic and not drawn to scale. The relative dimensions and ratios of parts in the drawings are exaggerated or reduced in size for clarity and convenience in the drawings, and any dimensions are merely illustrative and not limiting. In addition, the same reference numerals are used for the same structural elements or parts that appear in more than one drawing to exhibit similar characteristics.

An example embodiment of the present disclosure specifically represents an ideal example embodiment of the present disclosure. As a result, various variations of the illustration are expected. Accordingly, the example embodiment is not limited to a specific form of the illustrated area, and includes, for example, deformation of the form by manufacture.

Hereinafter, a check valve 400 according to an example embodiment of the present disclosure will be described with reference to FIGS. 1 to 4.

As shown in FIGS. 3 and 4, the check valve 400 according to an example embodiment of the present disclosure includes a valve body 410, a seat 420, a valve element 430, and a spring 440.

Specifically, as shown in FIG. 1, the check valve 400 according to an example embodiment of the present disclosure is installed in the brake system 101 and selectively transfers the oil stored in the reservoir 100 to the hydraulic pressure supply device 200.

The valve body 410 has a hollow 411 formed inside. The hollow 411 is formed long in one direction inside the valve body 410. Specifically, the valve body 410 may be part of a valve block of the brake system 101.

The seat 420 is disposed in the hollow 411.

The valve element 430 is disposed by being at least partially inserted into the seat 420. In addition, the valve element 430 moves along the longitudinal direction of the valve body 410. In addition, the valve element 430 may selectively supply the oil stored in the reservoir 100 to the hydraulic pressure supply device 200.

The spring 440 is disposed inside the seat 420 to provide elastic force to the valve element 430. Specifically, the spring 440 provides force in a direction in which oil supply between the reservoir 100 and the hydraulic pressure supply device 200 is blocked.

With such a configuration, the check valve 400 according to an example embodiment of the present disclosure may effectively supply the oil stored in the reservoir 100 when oil is required for the hydraulic pressure supply device 200, thereby effectively preventing delay in supplying oil to the hydraulic pressure supply device 200.

In addition, as shown in FIG. 2, the valve element 430 according to an example embodiment of the present disclosure may include a valve rod part 431 and a head part 432.

The valve rod part 431 may be disposed inside the seat 420. Specifically, the valve rod part 431 may be disposed through the inside of the seat 420. In addition, the valve rod part 431 may be formed long in one direction parallel to the longitudinal direction of the hollow 411.

The head part 432 is formed at one end of the valve rod part 431 and is disposed outside the seat 420 to block the movement of oil. Specifically, the head part 432 may be formed to have a relatively larger cross section than the hollow 411 and may be disposed outside the seat 420.

In addition, the check valve 400 according to an example embodiment of the present disclosure may further include a stopper 450.

The stopper 450 may be coupled to the valve element 430 to prevent the spring 440 from leaving from one side of the valve element 430.

Specifically, the stopper 450 supports one side of the spring 440 and may prevent the spring 440 from leaving from the valve element 430. The stopper 450 may be coupled to the valve rod part 431 to prevent the spring 440 from leaving.

In addition, the check valve 400 according to an example embodiment of the present disclosure may further include a guide 460.

The guide 460 may be disposed inside the seat 420. In addition, the guide 460 may support the movement of the valve element 430. In addition, the guide 460 may be disposed spaced apart from the stopper 450 around the spring 440.

Specifically, the guide 460 may be disposed spaced apart from the stopper 450 along the longitudinal direction of one side of the valve element 430. In addition, the guide 460 may support the other side of the spring 440. In addition, the guide 460 may be disposed spaced apart from the stopper 450 on the valve rod part 431.

In other words, the guide 460 and the stopper 450 support the spring 440, and the elastic force provided by the spring 440 may be effectively transferred to the valve element 430.

In addition, one side of the valve element 430 is at least supported by penetration, so that the guide 460 may support the valve element 430 so as not to be shaken during movement.

In addition, as shown in FIGS. 2 to 4, the guide 460 according to an example embodiment of the present disclosure may include a guide body 461, a guide support part 463, and a spring support groove 464.

A guide hole 462 may be formed inside the guide body 461 to support a part of the valve element 430. Specifically, one side of the valve element 430 may be supported by penetration inside the guide hole 462. In other words, the valve rod part 431 may be disposed by penetrating inside the guide hole 462.

A plurality of guide support parts 463 may be formed by radially protruding from the outer circumferential surface of the guide body 461 at a distance from each other. In other words, the plurality of guide support parts 463 formed by protruding from the outer circumferential surface of the guide body 461 may be spaced apart from each other radially.

For example, four guide support parts 463 may be formed around the guide body 461 as shown in FIG. 2.

The spring support groove 464 may be concavely formed in the guide support part 463. In addition, one area of the spring 440 may be supported by being inserted into the spring support groove 464.

Specifically, the spring support groove 464 may be formed by one area adjacent to the guide body 461 among the guide support part 463 being concavely recessed. The spring support groove 464 may transfer the spring 440 and the elastic force provided by it to the valve element 430 without shaking accordingly when the spring 440 extends and contracts.

In addition, the check valve 400 according to an example embodiment of the present disclosure may further include a seal 470.

The seal 470 may be disposed between one outer circumferential area of the seat 420 and the hollow 411. Specifically, the seal 470 may be provided to prevent noise generated when the valve element 430 and the seat 420 collide and effectively maintain the valve element 430 closed.

The seal 470 may be supported on the outer circumference of one area of the seat 420 adjacent to the area of the valve element 430 where the valve element 430 is opened and closed.

Specifically, the seal 470 may selectively contact the head part 432 of the valve element 430. As shown in FIGS. 3 and 4, one end of the seal 470 may be formed to extend in a direction facing the head part 432 so as to contact the head part 432 before the seal 470.

In addition, the seat 420 according to an example embodiment of the present disclosure, as shown in FIGS. 2 to 4, may include a seat body 421, a seat support protrusion 425, and a seal groove 423.

A hollow seat hole 422 may be formed by penetrating inside the seat body 421. Specifically, the guide 460 may be disposed inside the seat hole 422. Oil may pass through an inner side of the seat hole 422.

The seat support protrusion 425 may support the guide support part 463 by a part of the inner side of the seat body 421 being protruded. The seat support protrusion 425 may support the guide 460 on the seat 420 by one area of the seat hole 422 formed to protrude toward the center of the seat hole 422 to support the guide support part 463.

One outer circumferential area may be concavely formed to be the seal groove 423. In addition, in the seal groove 423, at least a part of the seal 470 may be inserted and supported.

Specifically, the seal groove 423 may be formed by one outer circumferential area of the seat body 421 adjacent to the head part 432 being concavely depressed to provide an installation area for the seal 470.

In addition, the check valve 400 according to an example embodiment of the present disclosure may further include a flow path 490.

The flow path 490 may be formed between a plurality of guide support parts 463 to allow oil to pass through. Specifically, the flow path 490 may be formed between the inner circumference of the seat hole 422 and the plurality of guide support parts 463 to provide a movement path for oil.

In other words, a plurality of flow paths 490 may be formed to correspond to the number of the guide support parts 463.

In addition, the flow path 490 may serve as an orifice and may effectively generate pressure.

The total area of the flow path 490 through which the oil passes may be increased compared to the conventional check valve, so that the oil supply delay to the hydraulic pressure supply device 200 may be reduced compared to the conventional check valve.

In addition, the check valve 400 according to an example embodiment of the present disclosure may further include a filter 480 as shown in FIGS. 2 to 4.

The filter 480 may be disposed in the hollow 411 to filter foreign substances remaining in the oil to be moved to the hydraulic pressure supply device 200. Specifically, the filter 480 is supported on the seat 420 and the stopper 450 may be disposed thereinside.

In other words, when the oil stored in the reservoir 100 flows into the hollow 411, the filter 480 filters foreign substances contained therein and guides the oil to be supplied to the hydraulic pressure supply device 200 through the flow path 490.

In addition, the seat 420 according to an example embodiment of the present disclosure may further include a filter support protrusion 426.

The filter support protrusion 426 may be formed by one area of the seat hole 422 being protruded and support one area of the filter 480. Specifically, the filter support protrusion 426 may be disposed spaced apart from the seat support protrusion 425.

For example, the inner diameter of the filter support protrusion 426 may be formed to be relatively larger than the inner diameter of the seat support protrusion 425. In other words, the inner diameter of the area of the seat hole 422 in which the filter support protrusion 426 is formed may be formed to be relatively larger than the inner diameter of the area in which the seat support protrusion 425 is formed.

In addition, the stopper 450 according to an example embodiment of the present disclosure may include a stopper body 451, a stopper support part 452, and a stopper support groove 453.

A stopper hole 454 may be formed by penetrating inside the stopper body 451. The valve rod part 431 may be inserted into and coupled to the stopper hole 454.

A plurality of stopper support parts 452 formed to protrude outward from the stopper body 451 and disposed to be spaced apart from each other in a radial direction of the stopper body 451 may be formed.

The stopper support groove 453 may be formed concavely in the stopper support part 452 to support at least a part of the spring 440 by insertion. Specifically, the stopper support groove 453 may be disposed in the direction facing the guide 460 of the stopper support part 452.

In addition, the inlet 110 of the reservoir 100 may be inserted into the check valve 400 according to an example embodiment of the present disclosure.

Specifically, the inlet 110 of the reservoir 100 may communicate with the check valve 400 to selectively restrict the movement of the fluid stored in the reservoir 100.

In addition, a grommet 120 may be disposed between the hollow 411 and the inlet 110 of the reservoir 100 to effectively prevent shock between the reservoir 100 and the check valve 400.

In addition, a discharge port 220 may be formed in the check valve 400. The discharge port 220 may communicate with the hydraulic pressure supply device 200.

In addition, the seat 420 according to an example embodiment of the present disclosure may be installed in the hollow 411 of the valve body 410 by press-fit.

One outer circumferential area of the seat 420 may be fixed to the inner surface of the hollow 411 by press-fit. Specifically, the seat 420 and the hollow 411 may be coupled and fixed by clinching.

For example, a concave part may be formed on the outer circumference of the seat 420 along the outer circumferential direction so as to be variable by an external force. Specifically, a plurality of the concave parts 427 may be formed along the longitudinal direction of the seat 420.

The inner surface of the hollow 411 and the outer surface of a part of the valve body 410 are pressed to face each other by clinching, and may be closely fixed by the concave part 427.

Through the coupling of the valve body 410 and the seat 420, compared to conventional fixing of a seat by deforming a block for fixing a seat, the hollow 411 does not need to be changed, and the size of the hollow 411 may be maximally utilized.

Accordingly, the flow of oil passing through the seat hole 422 may be smooth.

With such a configuration, the check valve 400 according to an example embodiment of the present disclosure may increase the total area of the flow path 490 through which oil passes compared to the prior art, so that oil may be effectively supplied to the hydraulic pressure supply device 200.

Hereinafter, referring to FIGS. 1 to 4, the brake system 101 according to an example embodiment of the present disclosure is described.

The brake system 101 according to an example embodiment of the present disclosure includes a reservoir 100, a master cylinder 300, a hydraulic pressure supply device 200, and a check valve 400, as shown in FIG. 1.

Oil is stored in the reservoir 100.

The master cylinder 300 is connected to the brake pedal 310. The brake pedal 310 is operated by a driver. The pedal force of the brake pedal 310 is transferred to the master cylinder 300.

A simulation part may be disposed inside the master cylinder 300 to provide a reaction force according to the pedal force of the brake pedal 310. In addition, a plurality of pistons and a plurality of chambers may be disposed.

The hydraulic pressure supply device 200 generates hydraulic pressure by an electrical signal output in response to the displacement of the brake pedal 310. Specifically, the hydraulic pressure supply device 200 may receive the driver's braking intention as an electrical signal from a displacement sensor of the brake pedal 310 (not shown) and supply hydraulic pressure necessary for braking to the plurality of wheel cylinders 641, 642, 643, and 644.

The hydraulic pressure supply device 200 is electrically operated and controlled.

The check valve 400 may selectively supply oil stored in the reservoir 100 to the hydraulic pressure supply device 200. Specifically, the check valve 400 allows the oil of the reservoir 100 to be moved to the hydraulic pressure supply device 200 in one direction.

The check valve 400 of the brake system 101 according to an example embodiment of the present disclosure may have the same configuration as the check valve 400 according to the above-described example embodiment of the present disclosure and may be provided.

Accordingly, in the brake system 101 according to an example embodiment of the present disclosure, the check valve 400 may effectively supply the oil stored in the reservoir 100 to the hydraulic pressure supply device 200 in one direction.

In addition, the hydraulic pressure supply device 200 according to an example embodiment of the present disclosure may include a piston 210.

The piston 210 may be moved forward and backward along the longitudinal direction of the hydraulic pressure supply device 200.

Specifically, the hydraulic pressure supply device 200 may be operated by a piston 210 operated by a motor generating rotational force by an electrical signal (not shown) or by pressure provided from an accumulator.

The check valve 400 may block the movement of oil between the reservoir 100 and the hydraulic pressure supply device 200 when the piston 210 moves in one direction. In addition, the check valve 400 may guide the oil of the reservoir 100 to be moved to the hydraulic pressure supply device 200 when the piston 210 moves in the other direction.

When the piston 210 moves in one direction (forward), the check valve 400 may block the movement of oil between the reservoir 100 and the hydraulic pressure supply device 200 and allow pressure inside the hydraulic pressure supply device 200 to be generated.

In addition, the check valve 400 may guide the oil of the reservoir 100 to be moved to the hydraulic pressure supply device 200 when the piston 210 moves in the other direction (backward). In addition, the check valve 400 may guide the oil of the reservoir 100 to be sucked into the hydraulic pressure supply device 200 when the piston 210 moves in the other direction.

For example, the hydraulic pressure supply device 200 according to an example embodiment of the present disclosure may be a single-acting type in which pressure is generated only when the piston 210 moves in one direction.

In the case of a single-acting type, in order to repressurize after the piston 210 moving forward, since the piston 210 must be moved backward and the oil in the reservoir 100 must be sucked, the check valve 400 may effectively provide this when the piston 210 sucks the oil.

In other words, the check valve 400 may guide the hydraulic pressure supply device 200 to suck oil of the reservoir 100 when the piston 210 moves in the other direction. The check valve 400 may be opened when the piston 210 moves in the other direction so that the oil of the reservoir 100 is moved to the hydraulic pressure supply device 200.

In addition, the brake system 101 according to an example embodiment of the present disclosure may further include a first and second backup flow path 510 and 510 and a cut valve 610.

The first backup flow path 510 may be connected to one side of the master cylinder 300 to supply oil stored in the reservoir 100 to the wheel cylinders 641, 642, 643, and 644.

A cut valve 610 may be disposed on the first backup flow path 510. The cut valve 610 may guide the oil stored in the reservoir 100 to pass through the master cylinder 300 and be supplied to a part of the wheel cylinder by opening the first backup flow path 510 when the brake system 101 is abnormal.

The cut valve 610 may maintain the first backup flow path 510 in a closed state when the brake system 101 is normally operating.

The second backup flow path 520 may be connected to the other side of the master cylinder 300 to supply the oil stored in the reservoir 100 to the wheel cylinders 641, 642, 643, and 644, or the fluid supplied to the wheel cylinders 641, 642, 643, and 644 may be discharged.

In addition, the brake system 101 according to an example embodiment of the present disclosure may further include a connecting flow path 540.

The connecting flow path 540 may connect the other side of the master cylinder 300 to the first backup flow path 510.

A connection check valve 400 is installed on the connecting flow path 540 to block oil of the first backup flow path 510 from flowing in one direction to the other side of the master cylinder 300.

In addition, the brake system 101 according to an example embodiment of the present disclosure may further include an inspection valve 620 and an inspection flow path 530.

The inspection flow path 530 may be connected to the other side of the master cylinder 300 and the flow path between the check valve 400 and the hydraulic pressure supply device 200.

The inspection valve 620 may be installed on the inspection flow path 530 to selectively open and close the inspection flow path 530. The inspection valve 620 is closed when an electrical signal is received by the electronic control unit, and may maintain an open state in normal times. Specifically, the closing of the inspection valve 620 may be utilized when inspecting whether or not the master cylinder 300 leaks.

Hereinafter, the operation process of the check valve 400 of the brake system 101 according to an example embodiment of the present disclosure will be described with reference to FIGS. 1 to 4.

When the piston 210 of the hydraulic pressure supply device 200 moves backward, the check valve 400 opens the hydraulic pressure supply device 200 so that the oil stored in the reservoir 100 is sucked.

The oil stored in the reservoir 100 through the inlet 110 of the reservoir 100 flows into the check valve 400.

The oil introduced into the hollow 411 of the check valve 400 passes through the filter 480. Accordingly, foreign substances contained in the oil are filtered through the filter 480.

As shown in FIG. 4, the oil filtered from foreign substances passes through the flow path 490, and the valve element 430 opens the seat hole 422. Specifically, the head part 432 of the valve element 430 is moved in the direction of opening the seat hole 422 by oil. At this time, the valve rod part 431 is also moved, and the spring 440 disposed between the guide 460 and the stopper 450 is compressed.

Accordingly, the oil passed through the flow path 490 may move to the discharge port 220 through the end of the seat hole 422 and be supplied to the hydraulic pressure supply device 200.

When the supply of oil to the hydraulic pressure supply device 200 is completed, as shown in FIG. 3, the valve element 430 closes the seat hole 422 by the restoring force of the spring 440.

Accordingly, the check valve 400 may block the flow of oil between the reservoir 100 and the hydraulic pressure supply device 200.

In this case, oil suction of the hydraulic pressure supply device 200 may be effectively performed, and oil supply delay to the hydraulic pressure supply device 200 may be reduced due to the increased flow path 490.

Although the example embodiments of the present disclosure have been described with reference to the accompanying drawings, those skilled in the art to which the present disclosure pertains can understand that the present disclosure can be implemented in other specific forms without changing the technical spirit or essential features.

Therefore, the example embodiments described above should be understood as illustrative in all respects and not limiting, the scope of the present disclosure is indicated by the appended claims, and all changes or modifications derived from the meaning and scope of the claims and their equivalent concepts should be construed as being included in the scope of the present disclosure.

EXPLANATION OF REFERENCE NUMERALS

100: Reservoir 101: Brake system
200: Hydraulic pressure supply device 210: Piston
300: Master cylinder 310: Brake pedal
400: Check valve 410: Valve body
411: Hollow
420: Seat 422: Seat hole
421: Seat body 423: Seal groove
425: Seat support protrusion
430: Valve element 431: Valve rod part
432: Valve head part 440: Spring
450: Stopper
460: Guide 462: Guide hole
461: Guide body 463: Guide support part
464: Spring support groove
470: Seal 480: Filter
490: Flow path

What is claimed is:

1. A check valve which selectively transfers oil stored in a reservoir to a hydraulic pressure supply device, comprising:
   a valve body with a hollow formed inside;
   a seat disposed in the hollow;
   a valve element which is disposed by being at least partially inserted into the seat, moves along a longitudinal direction of the valve body, and is capable of supplying the oil;
   a spring disposed inside the seat to provide elastic force to the valve element; and
   a filter disposed in the hollow and capable of filtering foreign substances remaining in the oil to be moved to the hydraulic pressure supply device.

2. The check valve of claim 1, further comprising:
   a stopper coupled to the valve element to prevent the spring from leaving from one side of the valve element.

3. The check valve of claim 2, further comprising:
a guide disposed inside the seat to be spaced apart from the stopper around the spring and configured to support movement of the valve element.

4. The check valve of claim 3, wherein the guide comprises:
a guide body with a guide hole formed inside to support a part of the valve element;
a plurality of guide support parts formed to protrude from an outer circumferential surface of the guide body and disposed spaced apart from each other radially; and
a spring support groove formed concavely in the guide support part and capable of supporting the spring.

5. The check valve of claim 4, further comprising:
a seal disposed between one outer circumferential area of the seat and the hollow.

6. The check valve of claim 5, wherein the seat comprises:
a seat body with a hollow seat hole formed inside;
a seat support protrusion in which a part of an inner side of the seat body protrudes to support the guide support part; and
a seal groove in which one outer circumferential area of the seat body is concavely formed, a part of the seal being supported by being inserted into the seal groove.

7. The check valve of claim 6, further comprising:
a flow path formed between the plurality of guide support parts and the seat hole, through which the oil moves.

8. The check valve of claim 5, wherein one side of the seal is disposed to be in contact with the valve element disposed outside the seat.

9. The check valve of claim 1, wherein the valve element comprises:
a valve rod part disposed inside the seat; and
a head part which is disposed outside the seat and capable of blocking movement of the oil.

10. The check valve of claim 1, wherein the seat is press-fitted inside the hollow so that at least a part of an outer circumference of the seat is closely fixed.

11. A brake system comprising:
a reservoir in which oil is stored;
a master cylinder connected to a brake pedal;
a hydraulic pressure supply device configured to generate hydraulic pressure by an electrical signal output in response to a displacement of the brake pedal; and
a check valve configured to selectively supply the oil stored in the reservoir to the hydraulic pressure supply device,
wherein the check valve comprises:
a valve body with a hollow formed inside;
a seat in which one outer area is fixed to an inner surface of the hollow by press-fit; and
a valve element which is disposed by being at least partially inserted into the seat, moves along a longitudinal direction of the valve body, and is capable of supplying the oil.

12. The brake system of claim 11, wherein the hydraulic pressure supply device comprises a piston, and
the check valve is configured to:
when the piston moves in one direction, block movement of the oil between the reservoir and the hydraulic pressure supply device; and
when the piston moves in the other direction, allow the oil of the reservoir to move to the hydraulic pressure supply device.

13. The brake system of claim 11, wherein the check valve further comprises:
a filter disposed in the hollow and capable of filtering foreign substances remaining in the oil to be moved to the hydraulic pressure supply device.

14. The brake system of claim 11, wherein the seat comprises a seat body with a hollow seat hole formed inside.

15. The brake system of claim 14, further comprising:
a guide disposed inside the seat hole and configured to support a part of the valve element so as to be movable.

16. The brake system of claim 15, wherein the guide comprises:
a guide body with a guide hole formed inside to support the part of the valve element; and
a plurality of guide support parts formed to protrude from an outer circumferential surface of the guide body and spaced apart from each other radially to be supported in the seat hole.

17. The brake system of claim 16, further comprising:
a flow path formed between the plurality of guide support parts and the seat hole, through which the oil moves.

18. The brake system of claim 15, further comprising:
a spring configured to provide elastic force to the valve element; and
a stopper disposed spaced apart from the guide in a longitudinal direction of the valve element to prevent the spring from leaving.

19. The brake system of claim 12, wherein the check valve is configured to, when the piston moves in the other direction, guide the hydraulic pressure supply device to suck the oil of the reservoir.

* * * * *